United States Patent [19]

Herbsleb et al.

[11] Patent Number: 4,935,862

[45] Date of Patent: Jun. 19, 1990

[54] METHOD AND APPARATUS FOR CONTROL OF FLUORESCENT LAMPS

[75] Inventors: Peer Herbsleb; Kjell Herbsleb, both of Virklund; Kurt Halberg; Karl A. Jensen, both of Laven, all of Denmark

[73] Assignees: Jorck & Larsen A/S, Them; Halberg & Thomsen Elektronik L/S, Skanderborg, both of Denmark

[21] Appl. No.: 114,601

[22] Filed: Oct. 30, 1987

[30] Foreign Application Priority Data

Oct. 31, 1986 [DK] Denmark ............................ 5230/86

[51] Int. Cl.[5] ............................................ H02M 7/537

[52] U.S. Cl. ...................................... 363/132; 363/22; 315/DIG. 7

[58] Field of Search ..................... 363/98, 132, 17, 22, 363/23, 131, 133, 157, 159, 163, 164, 165; 315/209 R, DIG. 7; 331/181; 323/249, 250, 329

[56] References Cited

U.S. PATENT DOCUMENTS

| | | | |
|---|---|---|---|
| 3,590,362 | 6/1971 | Kakalec | 363/22 |
| 4,398,128 | 8/1983 | Wollank | 315/119 X |
| 4,506,318 | 3/1985 | Nilssen | 363/132 |
| 4,513,364 | 4/1985 | Nilssen | 363/132 |
| 4,692,681 | 9/1987 | Nilssen | 323/347 |
| 4,745,537 | 5/1988 | Cheung | 363/132 |

*Primary Examiner*—Patrick R. Salce
*Assistant Examiner*—Kristine Peckman
*Attorney, Agent, or Firm*—Fleit, Jacobson, Cohn, Price, Holman & Stern

[57] ABSTRACT

A device to produce alternating electric current of high frequency for power consumers such as fluorescent tubes comprises a transformer with a winding connected in series with an output terminal and active electronic components controlling the output current, said active components being controlled by electric voltages produced by inductive feed back. Magnetic saturation is utilized to modify the induction relationship in such way that the active components cyclically change the direction of the output current. According to the invention the feedback takes place in two magnetic cores, each core being equipped with at least one further electric magnetization winding designated a command winding, as electric current is fed through the command windings whereby magnetic saturation of the magnetic cores is controlled. Hereby a combined control of the frequency and of the active electric power in a fluorescent tube is devised so that the luminous power may be controlled over a wide range while suitably high voltages are maintained to ignite the tubes properly.

9 Claims, 9 Drawing Sheets

METHOD AND APPARATUS FOR CONTROL OF FLUORESCENT LAMPS

Figure 1:
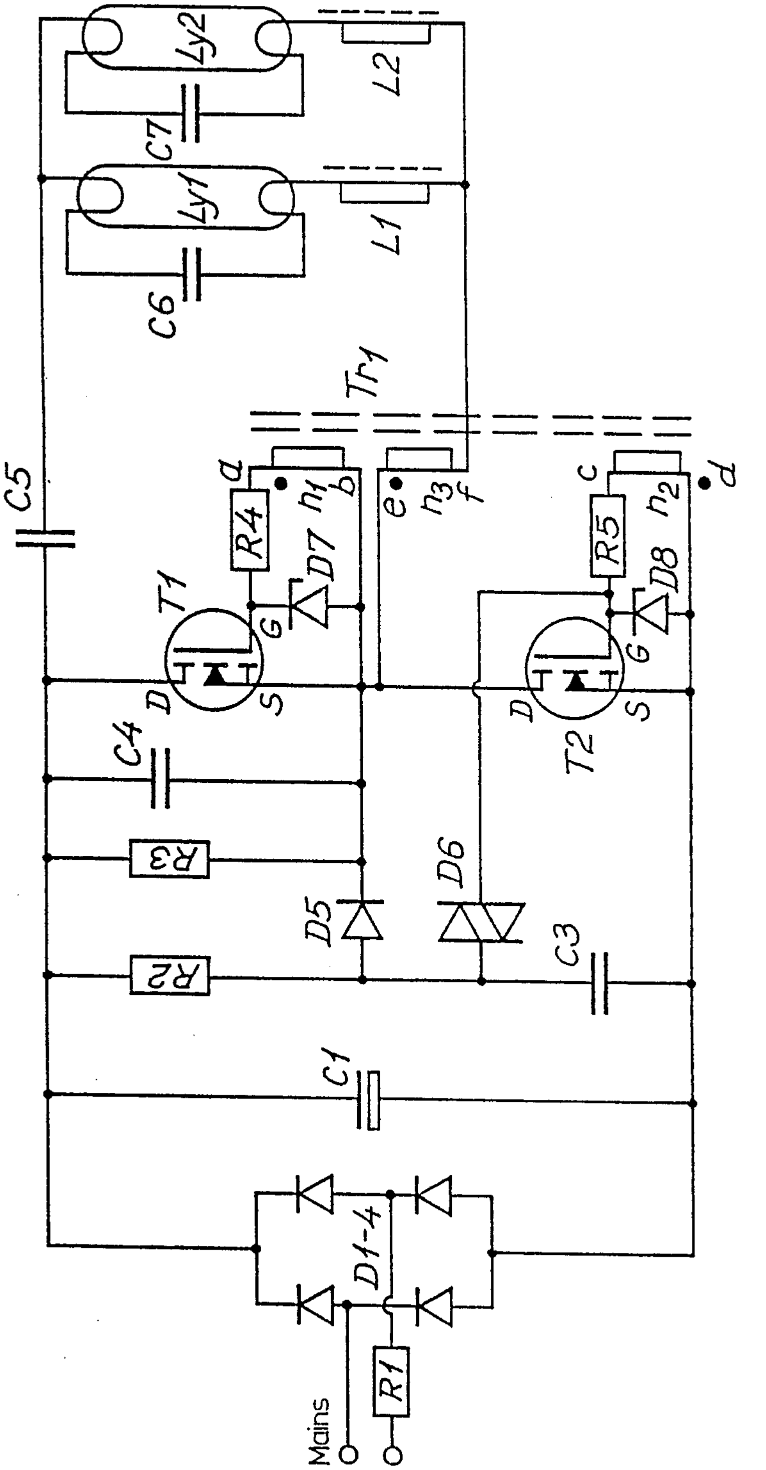
Fig. 1 Prior Art

This invention concerns a device and a method to produce and control high-frequency alternating electric currents for electrically powered devices, and in particular discharge lamps, such as conventional fluorescent tubes.

Fluorescent tubes are widely used as light sources, allthough they have not completely replaced the also very popular incandescent lamps from the market. The fluorescent tubes have among their advantages a relatively high luminous output in relation to the electric power consumed, long life and acceptable luminous properties. On the electric side, the fluorescent tubes, though, require more complicated measures than incandescent lamps, since the fluorescent tubes, when cold, require a particularly high ignition voltage to ignite the electric discharge, e.g. in the magnitude of 1000 volts peak value, and since the fluorescent discharge has a strongly negative impedance, which furthermore changes during ignition of the electric discharge. Therefore the power supply circuit for fluorescent tubes must be fitted with special equipment for the ignition and special equipment to limit the current. The electrodes of fluorescent tubes are traditionally equipped with means for electric heating, whereby the ignition voltage may be reduced to the magnitude of 800 volts peak value. The impedance, being negative and non-constant, necessitates the use of current limiting equipment and fluorescent tubes to be powered from a conventional voltage source are therefore practically connected through an induction coil in series. The ignition of a non-burning and cold tube normally is effected by electric switching, usually by means of an automatic switch, also called a starter, which has the important function to switch off the powered heating of the tube electrodes once the discharge has been ignited. To prevent premature burning of this switch it is normally also equipped with a capacitor in parallel. All of these components are included in a traditional luminaire for fluorescent tubes of the art of today.

With the usual mains frequency, whether fifty or sixty Hertz, the series induction must have a considerable size, and it feeds back into the mains line strong reactive currents, which are undesirable as they cause electric losses in the supply cabling. They can be reduced by so-called phase compensation by a capacitor, which must also have a considerable size. The induction in itself consumes a quite substantial amount of electric power, which is fully converted into heat. An ordinary luminaire equipped, for example, with two fluorescent tubes rated at 58 W each, i.e. a nominal luminous power of 116 W, thus in reality often consumer a power around 170 W. Another commonly known disadvantages by fluorescent tubes equipped as described is stroboscopic effect, since the luminous arch is ignited and turned off with a frequency of double the mains frequency, i.e. for instance 100 or 120 Hertz. This stroboscopic effect is usually not visible, but may under adverse circumstances cause inconvenience. Furthermore, acoustic noise is often induced, particularly by the induction coil, and the usual simple ignition device may cause slow ignition using several attempts accompanied by an unpleasant flicker. Furthermore, the automatic switch will, in the case that a tube has burnt out and is unable to ignite, still try to ignite it, causing a persistent flicker until the switch has been worn out.

It is anticipated that a considerable potential for energy savings can be utilized by the automatic control of illumination, for instance related to day light variations, as lighting systems of today often are operated on full power over extended periods of time, even though the places in question may also receive natural day lighting so that the artificial illumination is only partly needed or only needed in part of the time. It is today possible to fit automatic systems with light measuring devices and to control the electric power supplied to the lighting systems, i.e. for instance to maintain a predetermined illumination level.

Control of electric light sources is known in the art, also in relations with fluorescent tubes. With control of fluorescent tubes with the purpose to reduce the luminous power it must, however, be considered that the voltage cannot be reduced very much before the tubes fail to ignite. Control systems for fluorescent tubes therefore generally utilize a time control system, which is today generally realized with a socalled chopper control, which in essence ignites and turns off the tubes quickly, e.g. with the frequency of the mains, controlling the light level by reducing the duty cycle, i.e. the ratio between burning time and dwell time. These control systems, which are used today, however, have several disadvantages, among which creating a source of emission and transmission of electric radio frequency noise, and causing the normally undesirable stroboscopic effect already present by fluorescent tubes to be severely aggravated. Furthermore, the full lamp power has to pass the components of these control systems, which must therefore be sized for a similarly large electric power.

It is also known in the art to control electric power by utilizing the socalled transductors. To explain briefly, transductors are transformers wherein the current transformed is limited by magnetic saturation in the transformer core. The saturation may be controlled by an extra magnetization winding, which influences and controls the power being transformed. In the technology of today, transductor control systems are very rarely used, since transductors are rather costly, and since they are unable to control properly when feeding reactive or capacitive loads.

The above problems in the control of fluorescent tubes often lead to the practical selection of incandescent lamps for illumination systems with control facility. A incandescent control system may be constructed, having, though, two major draw backs. Firstly, the illumination changes colour by going into the red when reduced, and secondly the already low luminous efficiency of the incandescent lamps is considerably even further reduced. It is understandable that systems with illumination control today are not widely used since they, as explained, either provide unpleasant lighting or poor economy.

It has recently been suggested to feed fluorescent tubes from a high-frequency generator, refer e.g. to Siemens publication "Schaltbeispiele", Ausgabe 82/82, p. 78. Herein a circuit is described for converting a supply voltage at a frequency of e.g. 50 Hertz to AC power at a frequency of approximately 120 kHz. By powering fluorescent tubes with such a circuit a number of significant advantages are gained, such as increased light output, as:

the efficiency of the lamps are higher by this high frequency, longer tube life, no mechanically movable parts in the luminaire accessories, no stroboscopic effect, as the electric discharge arch does not turn off during the extremely brief intervals where the currents change to the alternate direction, the circuit is phase compensated, instant ignition of the fluorescent tubes, no flicker on burned out tubes, and the typically provided rather costly and energy consuming induction coils are reduced in size, and their power consumption is similarly reduced.

Such circuits are still not very common, but it is anticipated that they will soon gain widespread use, as they can be built rather cheaply, and as they have the substantial advantages explained.

It is noted that a separate circuit of this type is required in every single luminaire as currents at these very high frequencies cannot economically be supplied over any substantial distance, even with special high-frequency cabling.

This circuit and similar circuits have, however, the disadvantage that they cannot readily be equipped with control facility.

It is the object of the invention to provide a device, by which a power consumer, such as a fluorescent tube, can be supplied with electric current at a high frequency, whereby the current is controllable, and whereby output voltages are developed, even when the current is reduced, of such levels that, e.g., fluorescent tubes will ignite without difficulties.

With the present inventive device numerous advantages are obtained, among which are mentioned the following:

A control facility can be provided with a rather simple command circuit, since the command signal may be a DC signal. The control system does not give rise to the stroboscopic effect present with the control systems of the known art, and neither does it give rise to radio frequency noise. The electric circuitry for the control can operate at low voltages and has no DC coupling to the power supply. The control strategy may be varied over a wide frequency range, and it is possible to control separately the positive and the negative half-periods of the currents, whereby the shape of the curve over the current versus time may be influenced, noting though that the circuit shown is not capable of producing a net DC current on the output terminals. The circuitry may further be built in a very compact size in order that it may be fitted inside conventional luminaires.

The command circuitry used with the invention can be sized to small power demands as a command current of the required magnitude can be generated and maintained without difficulties.

According to a preferred embodiment the feedback windings are routed around both of the magnetic cores so that a magnetic signal from either of these cores will induce voltages around both of the magnetic cores, and thus in both feed back windings. However, these windings are sized so that a signal from only one of these cores by the prevailing output currents is not sufficient to effect feedback; this can only be effected by the added signal from both magnetic cores. Since the command windings are routed around both cores, but in opposite directions relative to the feedback loops, a circuitry is achieved exhibiting the unexpected and rather surprising behavior that the maximum power for the power consumer is obtained when the command current is zero, and that the feed-in of a command current will reduce the output power regardless of the direction of flow of this command current.

Hereby is obtained the advantage that the system assembly is facilitated as the electrician does not have to pay attention to identify the control terminals individually. Furthermore, it is positively guaranteed that the circuit can never produce a larger output current than acceptable. Furthermore, it is possible even to operate the command circuit with AC, provided that this command current AC has a frequency which is suitably low relative to the output power frequency. This, however, leaves a wide range, since the output power frequency may be of the order of 100 kHz.

This allows for numerous applications, among which only two examples will be mentioned to illustrate the degree of sophistication possible. The device according to the invention may, as a first example, be used to provide a stroboscope operating with fluorescent tubes as light source, whereby a light output may be provided, exceeding the light power that can normally be provided with a stroboscope. As a second example an illumination could be modulated with an audio signal from a music system, such as one could imagine used in a discoteque or dance restaurant to produce a fancy effect lighting.

A further object of the invention is to provide an illumination system which saves energy by automatically adapting the illumination level in correspondance with the day lighting, ensuring that the illumination level is always sufficient, and ensuring a pleasant illumination since frequent switching of the lighting does not take place, and which system can be produced at relatively low costs.

Figure 2:
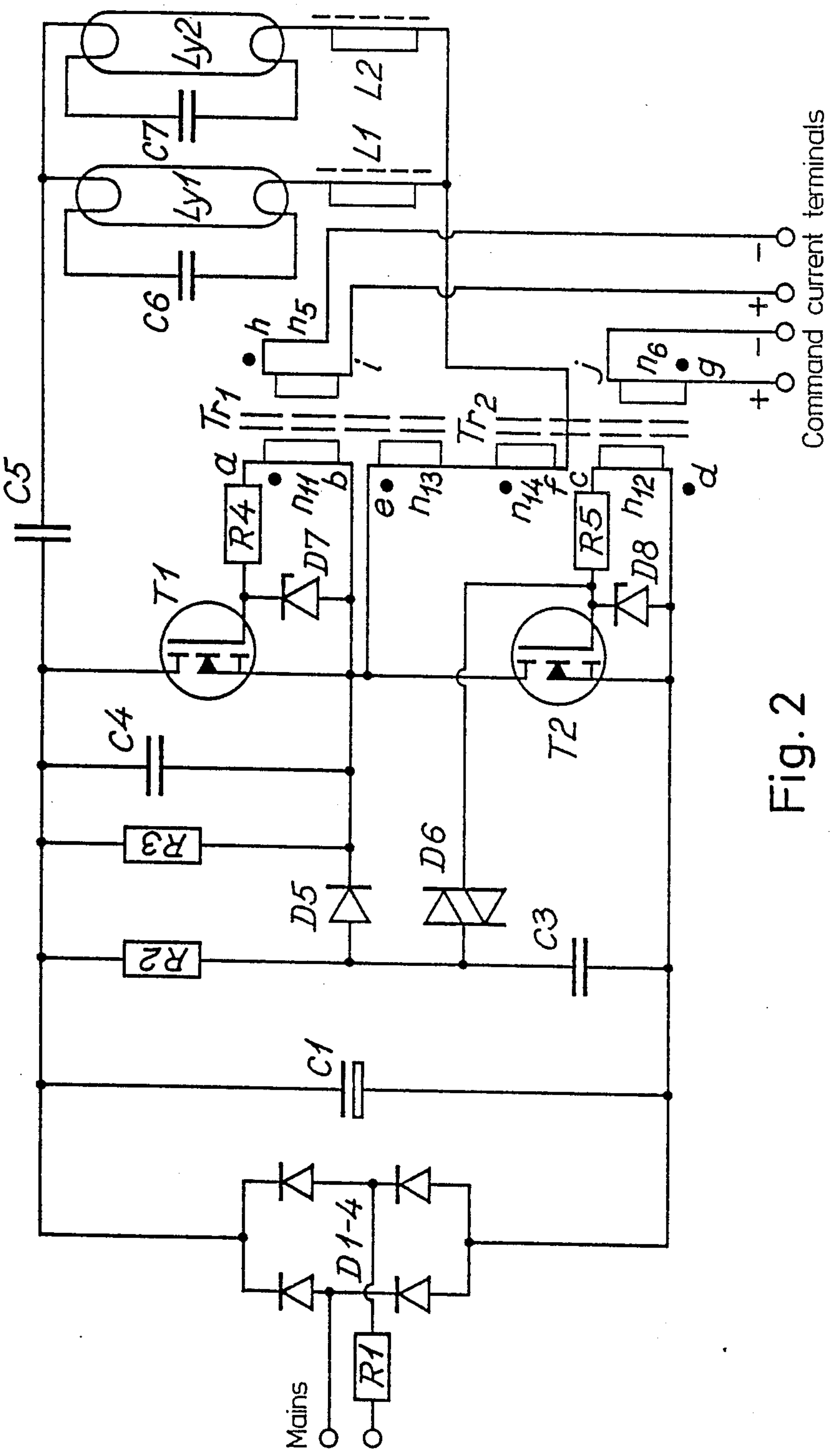
Figure 3:
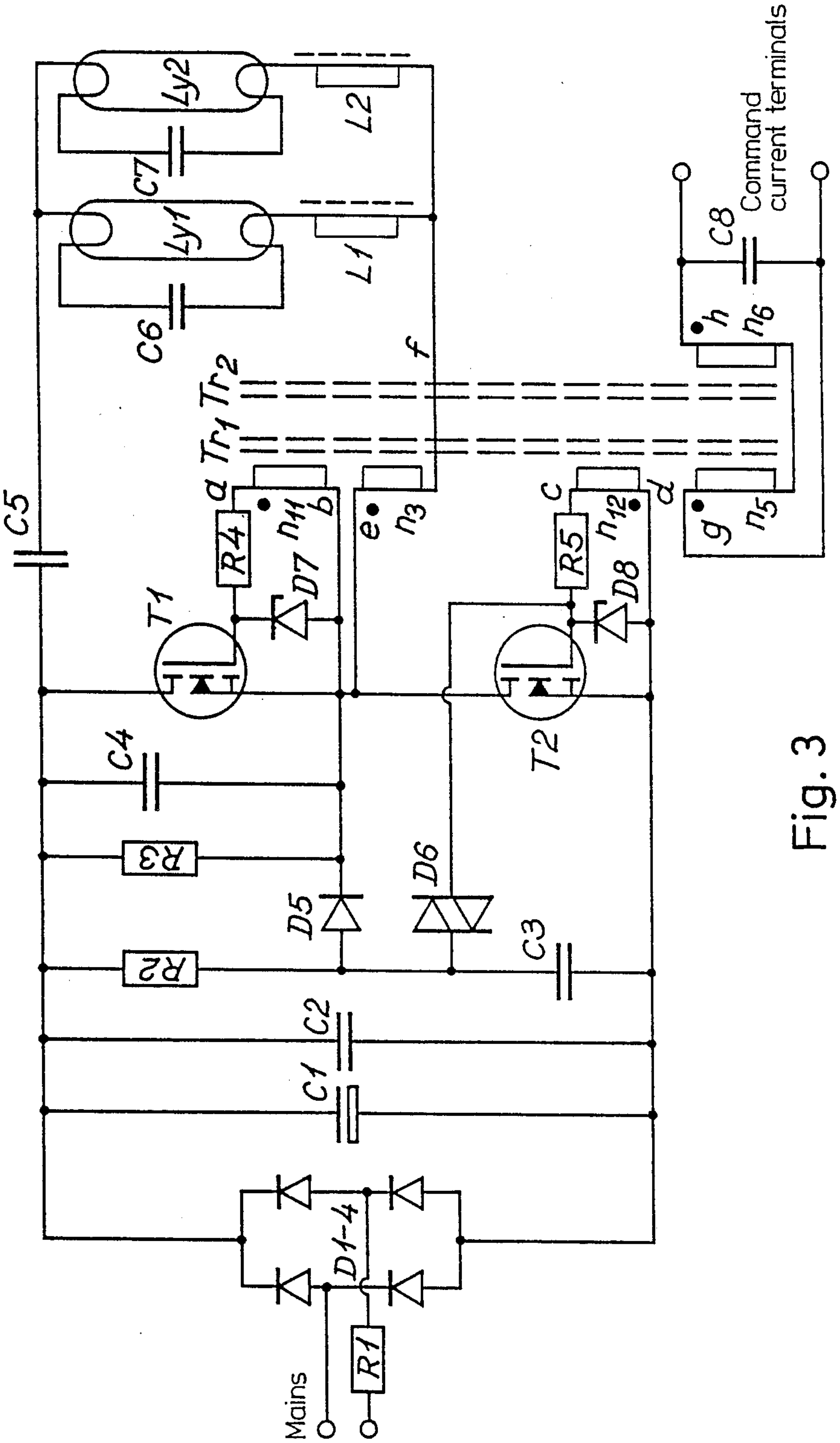
Figure 4:
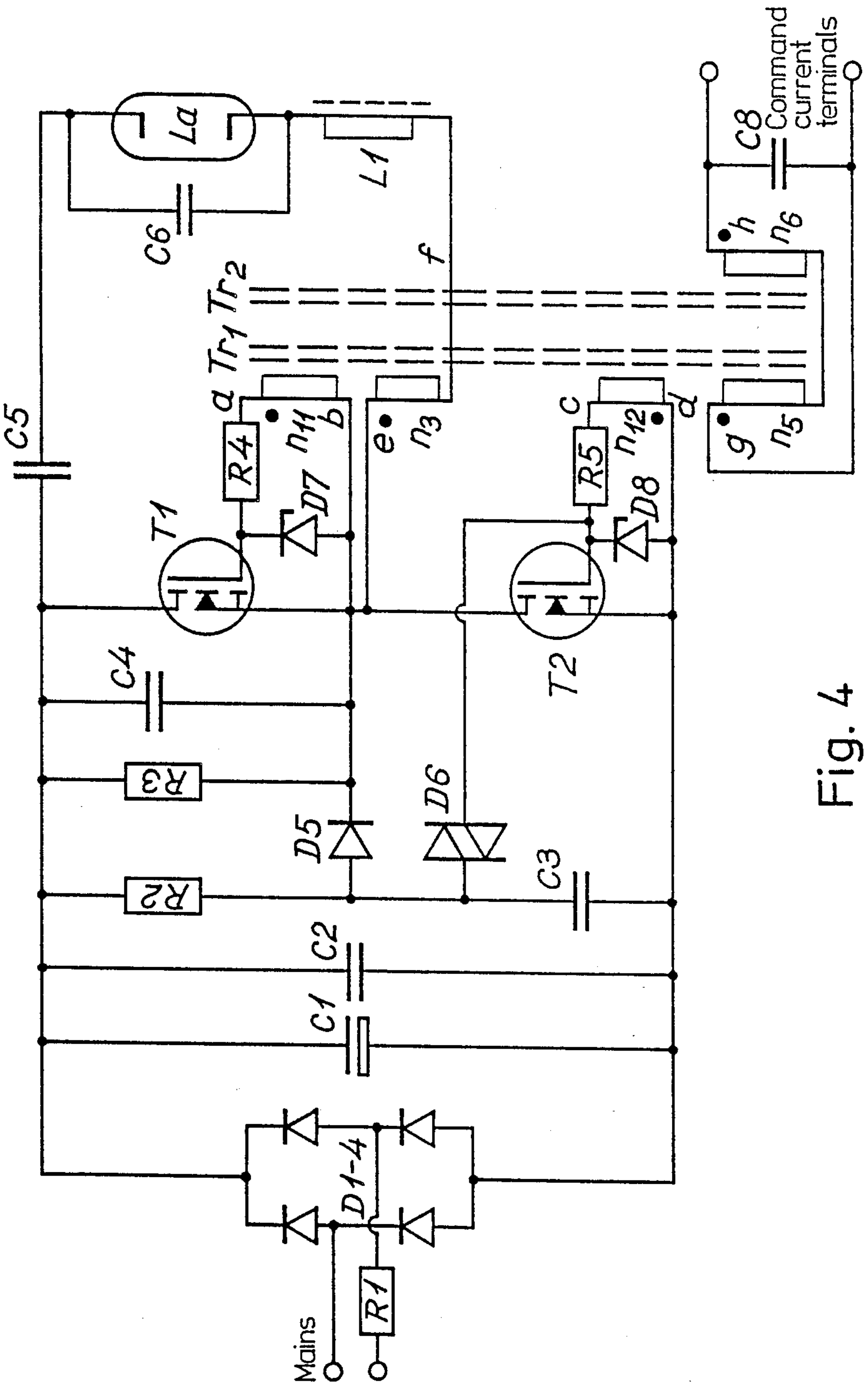
Figure 5B:
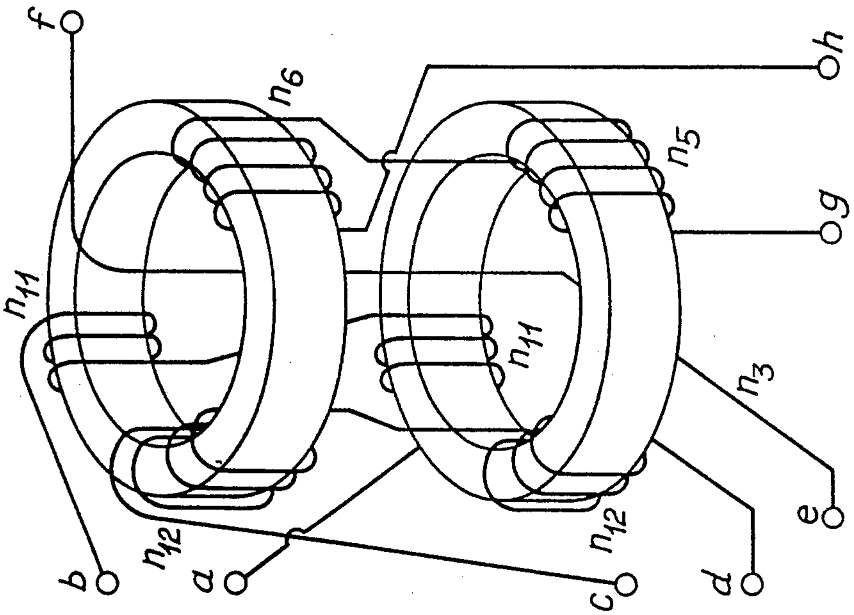
Figure 5A:
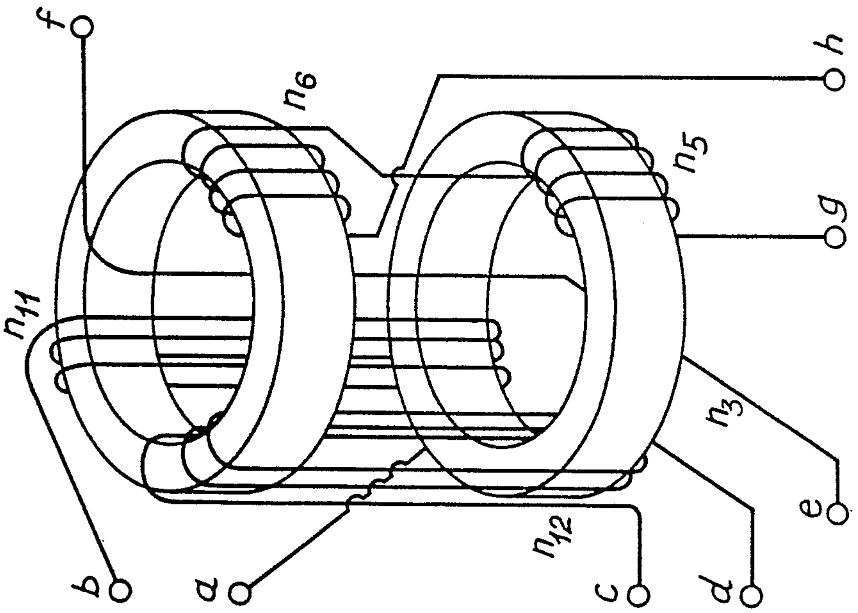
Figure 6:
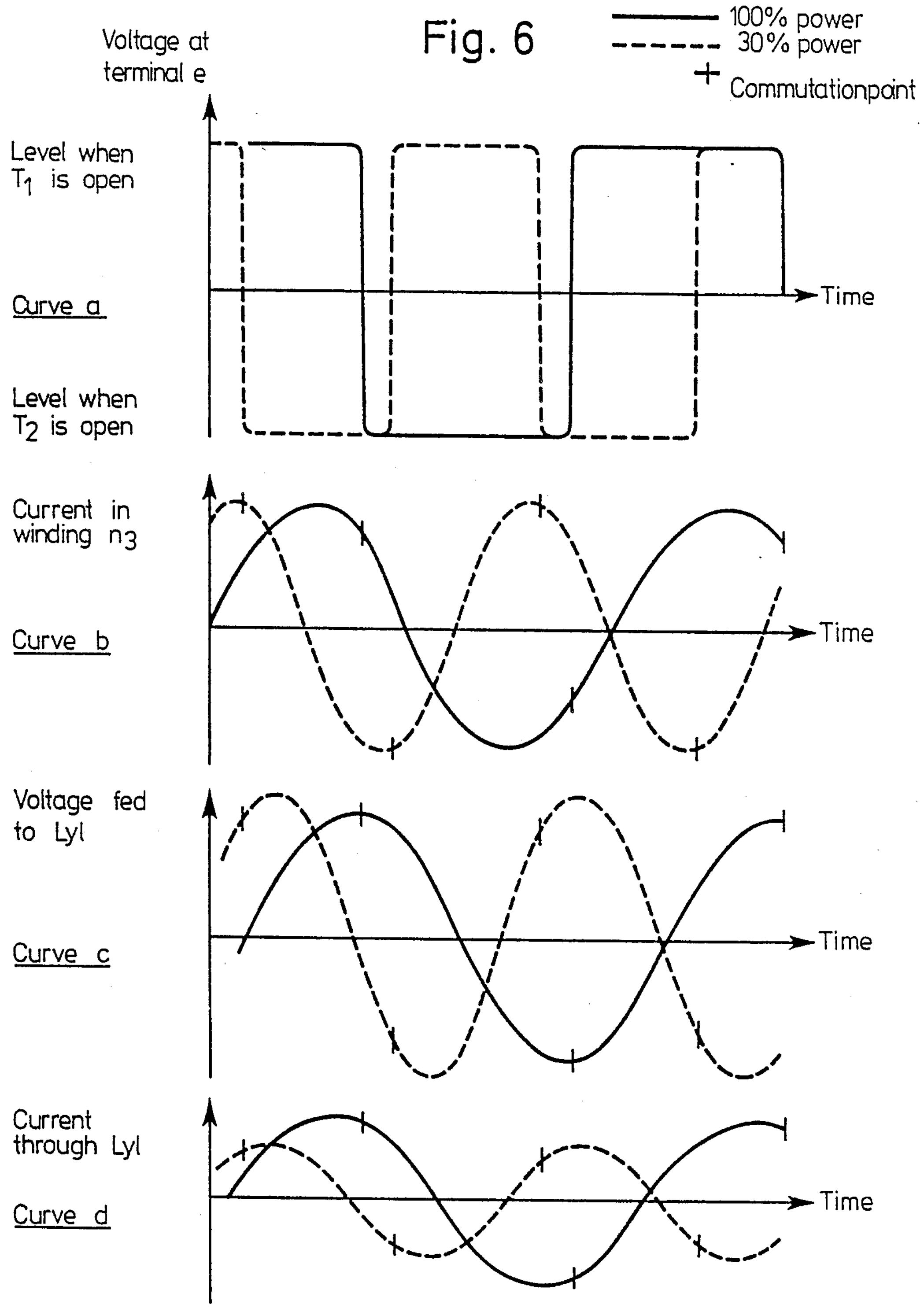
Figure 7:
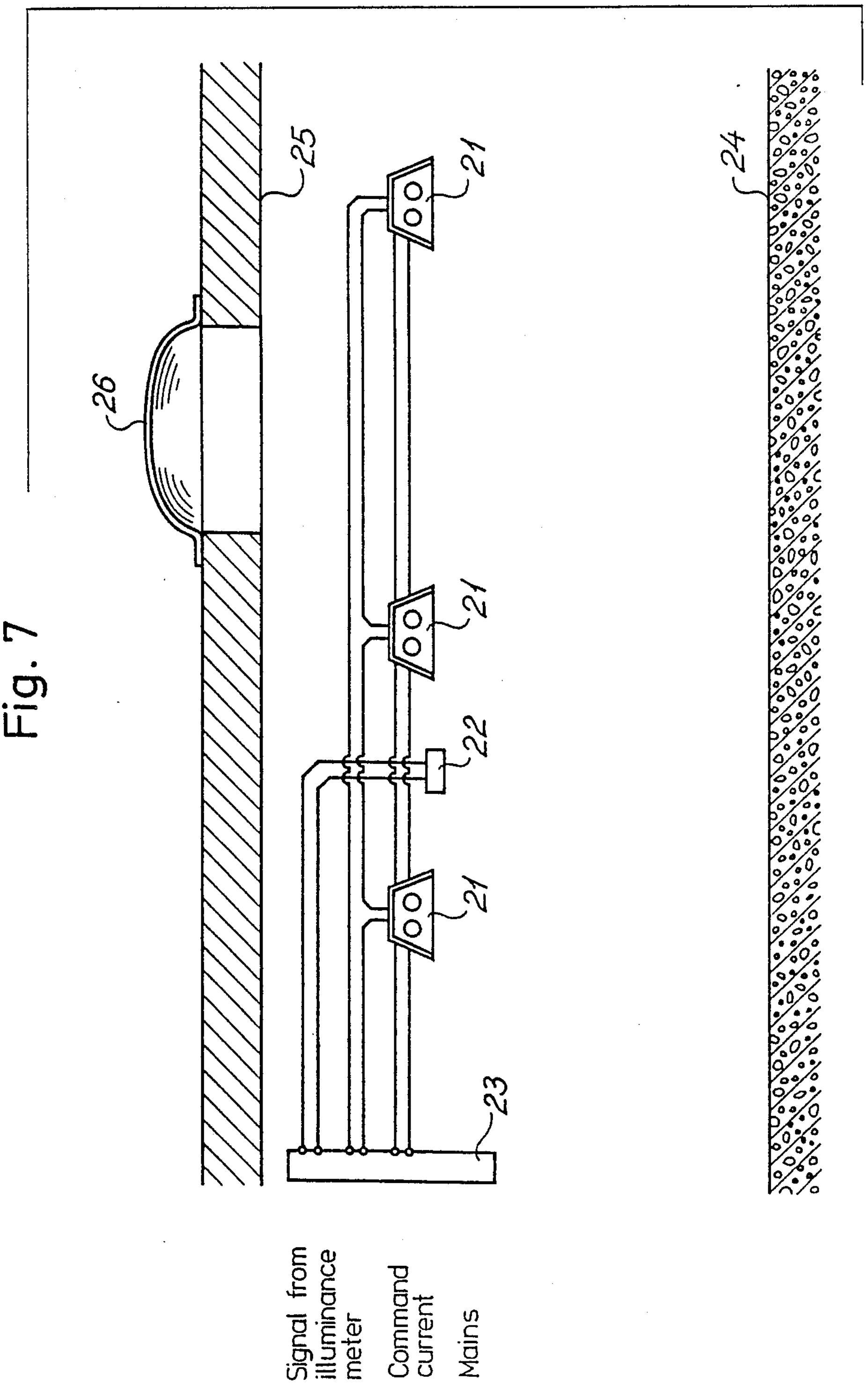
Figure 8:
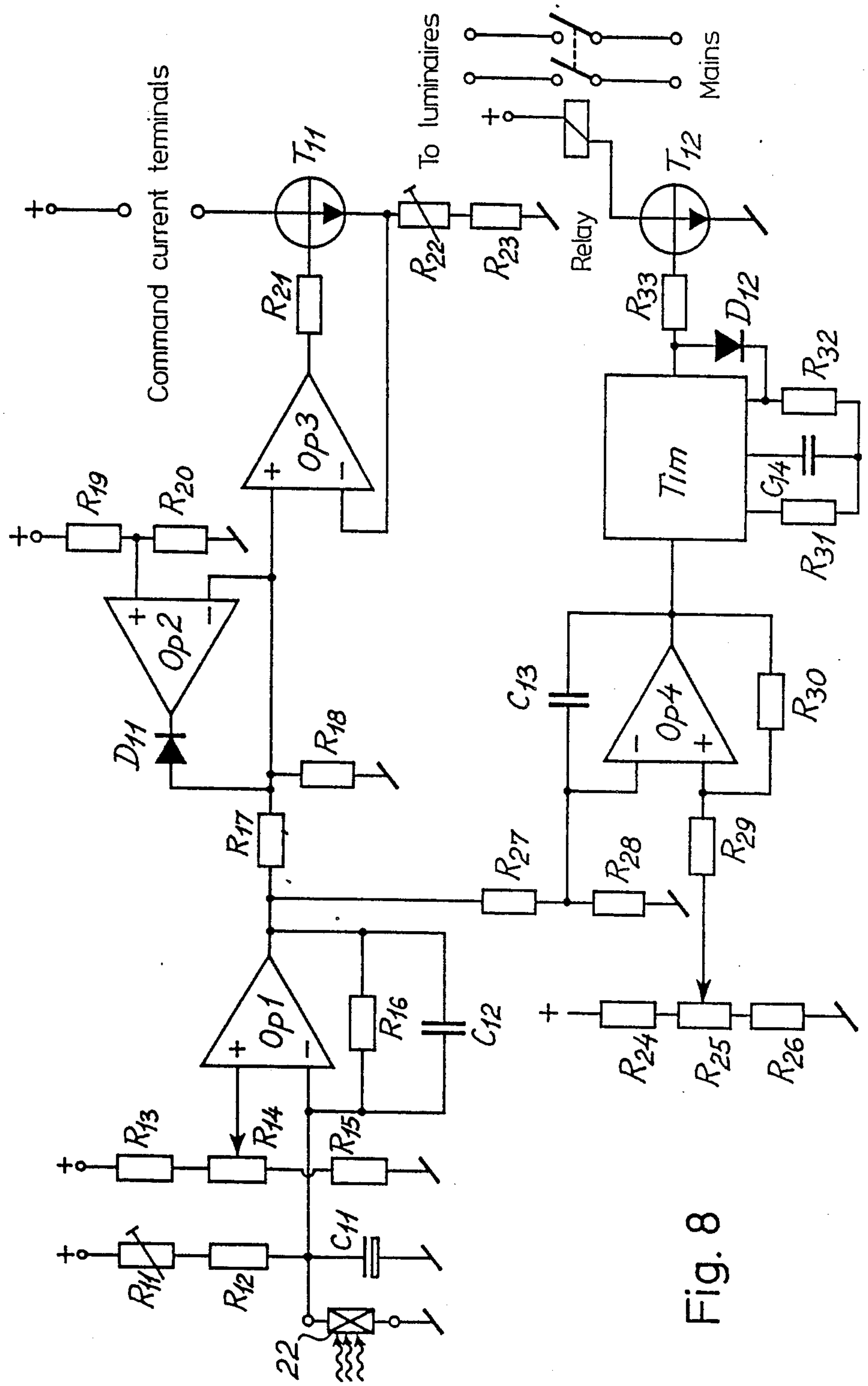
Figure 9A:
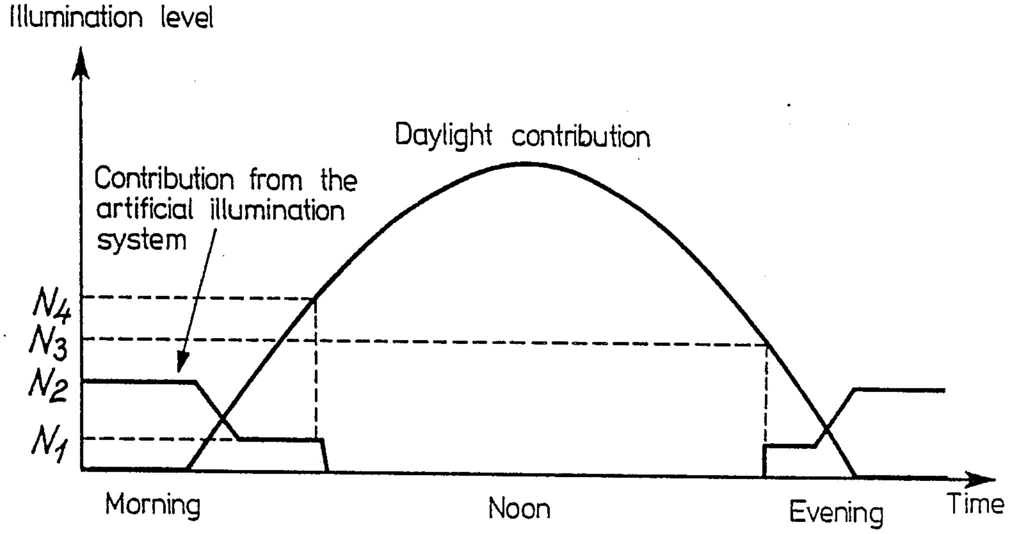
Figure 9B:
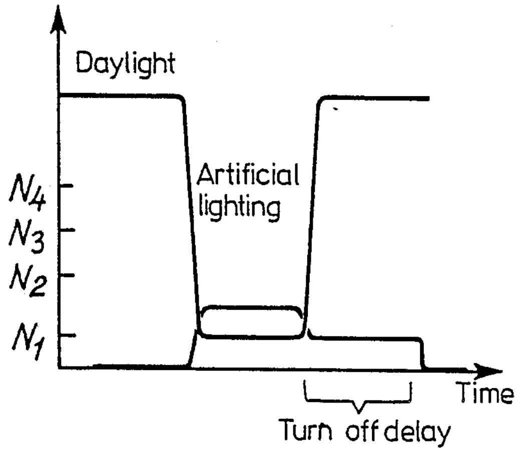
Figure 9C:
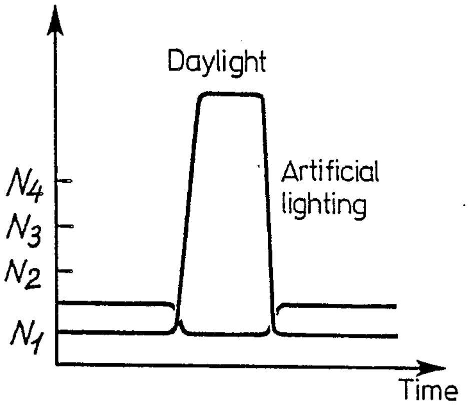

In the following the invention will be explained in more detail with reference to the accompanying drawings, wherein FIG. 1 shows a diagram of an electronic circuit of the known art to produce a high-frequency alternating electric current, FIG. 2 shows the circuit according to a first embodiment of the invention, FIG. 3 shows a circuit of a second embodiment of the invention, FIG. 4 shows a circuit similar to the circuit of FIG. 3, but adapted to feed a vapour lamp instead of fluorescent tubes, FIGS. 5*a* and 5*b* show the arrangement of the electric windings on the magnetic cores according to the invention, FIG. 6 is a plot of various illustrative electric signals in a circuit according to the invention plotted versus time, FIG. 7 shows an illumination system with several luminaire fixtures controlled automatically according to the invention, FIG. 8 shows an electronic control circuit to provide command signals for the control devices in the luminaire fixtures, and FIGS. 9*a*–9*c* show examples of illumination levels that can be produced by an illumination system according to FIGS. 7 and 8, illustrating also the influence of various external factors, and plotted versus time.

To better understand the invention, the high-frequency circuit of the known art will first be explained, referring to FIG. 1. This circuit is supplied through a resistor R1 with electric power from the mains circuit, which power is rectified in a bridge rectifier D1, D2, D3, and D4 and smoothened by a capacitor C1 to produce a direct current. By using two electronic amplifier devices in a push-pull coupling the voltage of the terminal e in FIG. 1 may be controlled within the range defined by the DC voltage. From the terminal e a current is drawn, which is fed through a transformer winding to two parallel inductances, each connected to a respective fluorescent tube in series. The current power loop is completed by a capacitor C5. By this circuit it is possible to feed the fluorescent tubes with alternating current with a frequency determined by the values of the components.

The active electronic devices T1 and T2 are metaloxide-power transistors, such as those commercially available under trade marks like MOSFET, SIPMOS, and HEXFET. Such a component has three terminals marked S for "source", D for "drain", and G for "gate". They are commercially available with various polarities, and the type explained in the following is the so-called N-channel where the D terminal by the practical application is connected to a positive voltage and S to a negative voltage, whereafter the current flowing from D to S can be controlled by the voltage applied to the terminal G. It is one of the characteristic features of these types of transistors that the G terminal exhibits an extremely high impedance, and that the current flowing from D to S may be controlled with a very high current gain factor. When the voltage on G is negative relative to S the transistor is completely closed. With positive voltages on G, which do not exceed a characteristic threshold value, typically of the magnitude of 4 volts, this transistor is still closed for current. Only when the voltage on G exceeds this threshold value a current is allowed to flow from D to S. Because of the extremely high impedance of the G terminal in such transistors, external components to protect the transistor against overvoltages must be provided. Therefore the transistor TI in the figure has been provided in the gate circuit with a resistor R4 and a zenediode D7, and the transistor T2 has similarly been provided with a similar resistor R5 and a zenerdiode D8, which components ensure that the voltages fed to the G terminals can never rise to a level which could cause damage of the transistors.

The explanation of the start up of this circuit will be postponed for a moment, until the function of the circuit during regular oscillations has been explained. During the regular oscillations the transistors T1 and T2 open and close alternatively as they, of course, may never be open simultaneously. In the moment that e.g. the transistor T2 opens up, the voltage at the terminal D of this transistor and thereby at the terminal e assumes a value, which apart from a negligible voltage drop from the terminal D to the terminal S on T2 will equate the negative pole of the supply voltage. The circuit will therefore attempt to conduct current through the small transformer winding $n_3$ from the components around the fluorescent tubes. As it can be seen from FIG. 1 there is parallel to each fluorescent tube connected a capacitor C6 and C7, respectively and there is in series with each fluorescent tube connected an inductance L1 and L2, respectively, from the first and from the second tube. As the inductances L1 and L2 are connected in series with the fluorescent tubes and have a considerable inductance, they will limit the current allowed through so that the current will only gradually increase. As long as the fluorescent tubes are not ignited the current may pass through the parallel capacitors C6 and C7, respectively, and drawn through the capacitor C5, completing the power loop. Once the luminous arch in the tubes has ignited, current is drawn through the tubes and also through the parallel capacitors.

In FIG. 6 the curve a in solid lines indicates the voltage at terminal e and the curve b representing the current through the winding $n_3$ versus time, and it can be seen from the curve a of this figure that this voltage for a certain interval of time is generally constant at a negative value. Curve b of the same figure shows how the current changes, the polarity of the curve being selected so that the current by the start of the time interval, where e has a negative voltage, is at a high level and shifting towards a lower level. This change of current through the winding $n_3$, however, induces a magnetic field in the magnetic core of the transformer TR. This changing magnetic field induces voltages in the two feedback windings, $n_1$ being connected to the G terminal on T1, respectively $n_2$ being connected to the G terminal on T2. The directions of these windings are selected so that a current being drawn through T2 induces such a voltage in $n_1$ that the voltage on the T1 terminal G stays negative relative to the T1 terminal S, so that T1 remains completely closed. The feedback loop $n_2$ is connected so that the same magnetic field simultaneously induces a voltage on T2 terminal G, which is positive relative to T2 terminal S, and this positive voltage keeps the connection through T2 from D to S open.

However, the current through the winding $n_3$ will with suitable dimensions of the components in the circuit after some time have risen to such a level that the magnetic core in TR is magnetically saturated, whereafter it is no longer possible through this core to induce voltages in $n_1$ and $n_2$. Therefore the voltage in $n_1$ drops to zero, but since T1 at this time already was closed, the state in T1 is not changed. Simultaneously the voltage in $n_2$ drops to zero, but this causes T2 to close and stops the current from D to S of T2. The current through $n_3$ does not drop instantly, even when both transistors T1 and T2 are blocked, as the inductances L1 and L2 can maintain some current through $n_3$, which is possible because of the connection to the resistor R3 and the capacitor C4; therefore the current will not instantaneously disappear, but will instantaneously initiate a decrease. This starting decrease of the current through $n_3$ will immediately induce current in the feedback loops $n_1$ and $n_2$, having opposite directions of those described in the previous period. Thus in $n_2$ a voltage is induced, making the T2 terminal G negative relative to the T2 terminal S, whereby T2 will be closed. Simultaneously, however, a voltage is induced in $n_1$, making the T2 terminal G positive relative to the T1 terminal S, and thus T1 will be open for current from the terminal D to the terminal S. The voltage at the terminal e will therefore, apart from a negligible voltage drop over T1 essentially equate the positive supply voltage pole, as can be seen from the curve a in FIG. 6 at a later interval of time. Because of the inductances L1 and L2 in series the current changes gradually so that continued voltages are induced in $n_1$ and $n_2$, which maintain this process, since the induction in a transformer, as it is well-known for those skilled in the art, is proportionate to the rate of current change rather than to the magnitude of the current.

It is understood that the capacitance of the capacitor C5 is sufficiently large to ensure that the voltage on that terminal of C5 which is connected to the lamps remains essentially constant at a value at the midpoint between the positive and the negative supply voltage, and it is therefore possible to feed a current through the lamps when T1 is open and T2 is closed. The current through $n_3$ follows the pattern shown at a later stage of curve b in FIG. 6, and it can be seen that the pattern is similar to the pattern of the first time interval, only with a change of sign. The current through $n_3$ continues to increase in the new direction, until the TR core is again saturated, this time in the direction opposite the one previously, whereupon the voltages in $n_1$ and $n_2$ drop to zero, and T1, as earlier T2, closes, whereby T2, because of a newly induced voltage in $n_2$, is opened and the whole passage is repeated. It is understood that the circuit thus can maintain cyclic oscillations, the circuit being designed so that the frequency of these oscillations is essentially governed by the inductions L1 and L2, the capacitances C6 and C7, and by the lamps. The capacitor C4 ensures, during the switch-over interval, when both transistors T1 and T2 are closed, that the voltages on T1 terminal S and the hereto connected T2 terminal D will not rise to so high levels that they could be harmful for the transistors.

The voltage and the current at the fluorescent tube Ly1 is shown with solid lines in curve c and d in the FIG. 6. It is noted that the impedance of a fluorescent tube at frequencies of the order of 100 kHz, as here, exhibits a more stable value than is normally observed when powering the tubes with 50 Hz or 60 Hz.

Now the start up of the oscillations will be explained. Initially all voltages of the circuit are zero, and no currents are flowing. When the mains supply is connected to the terminals to the left in FIG. 1 the parts of the circuit mentioned so far will in fact be unable to initiate oscillations. This may be surprising as electronic oscillators are generally self-starting, since small random noise signals, always present, are generally amplified and fed back, and therefore generally will provide the starting signal for a feedback generator. However, a field effect transistor, of the type used herein does not respond until the voltage on the G terminal exceeds the voltage on the S terminal with a substantial amount, e.g. 4 volts. The circuit has therefore been provided with a number of dedicated components R2, C3, D5, and D6, which have been inserted into the circuit with the sole purpose of starting the oscillations. At the point in time when the power is switched on to the circuit, the capacitor C3 will slowly be charged through the resistor R2. The electronic component D6 is, however, a socalled DIAC, which exhibits the peculiar behavior that it is completely blocked for current until the voltage exceeds a predetermined level, the socalled break down voltage, e.g. 32 volts, whereupon it suddenly opens up for current, remaining open even by decreasing voltages as long as any current flows through it. When the voltage on C3 thus exceeds the DIAC break down voltage, D6 will open up, and the T2 terminal G will be fed with a positive voltage, which is sufficiently high to open up for current from T2 terminal D to T2 terminal S, whereby oscillations in the oscillation generator will be started. During cyclic oscillations C3 will have only very brief intervals, i.e. the intervals where T1 is open, to be charged through R2, whereafter C3 upon the opening of T2 will be immediately and fully discharged through the diode D5. By suitable sizing of R2 and C3 it can therefore be ensured that the voltage on C3 during cyclic oscillations will never reach such a level that D6 will open.

The tubes may be provided with conventional series-connected fuses (not shown in the drawings).

EXAMPLE 1:

A circuit similar to the one in FIG. 1 is constructed with the following components: R1=3.3Ω, R2=270 kΩ, R3=330 kΩ, R4 =100 Ω, R5=100 Ω, C1=47 μF, C3=0.1 μF, C4=1nF, C5=100 nF, C6=3.3 nF, C7=3.3 nF, L1=L2=420 μH, and the lamps being 50 W fluorescent tubes. The transistors are Sipmos BUZ 41A, the zenediodes D7 and D8 are BZY 97 C8V2, and the transformer TR is wound around a ferrite ring core, Siemens R12,5, $n_1$ incorporating three turns, $n_2$ three turns, and $n_3$ one turn. With these component values, the above mentioned Siemens publication states the idle frequency, when the lamps are not ignited, to be around 150 kHz, and the duty frequency, when the lamps are lighted, to be around 120 kHz. The idle frequency essentially equates the resonance frequency of the oscillation pair L1, C6, which is equal to the resonance frequency of the other pair L2, C7, whereby the voltages over the lamps will rise to very high values, e.g. of the magnitude of 1000 Volts, causing the immediate ignition of the lamps.

Now the circuit of the invention first embodiment will be explained by reference to FIG. 2. As it may be seen in this figure it is distinguished from the conventional circuit shown in FIG. 1 by the feedback transformer, which according to the invention has been divided into two parts. Furthermore the inventive circuit is equipped with terminals for the feed in of a command current. The remaining part of the circuit is quite similar to the circuit of FIG. 1, and similar components have been indicated with the same references, and regarding the general operation, reference may be had to the above given explanation in connection with FIG. 1. The inventive circuit is distinctively featured by the feedback transformer being split into two parts, Tr1 and Tr2. Tr1 has a feedback winding $n_{11}$ connected to the T1 terminal G, a winding $n_{13}$ conducting the lamp output current, and Tr1 has according to the invention a further winding $n_5$ to be connected to a command current circuit (not shown). Tr2 has a feedback winding $n_{12}$ connected to T2 terminal G, a winding $n_{14}$ conducting the lamp output current, and a winding $n_6$ to be connected to a further command current circuit (not shown). As it may be understood from the figure the output current from the terminal e to the lamps passes windings on both transformer parts. The orientation of the windings has been marked with dots on the figure according to a standard conventionally used.

Considering initially the case where no current flows in the command circuits, it may be understood that the lamp output current is capable of inducing voltages in the feedback windings $n_{11}$ and $n_{12}$, as the output current passes a winding on Tr1 and thereafter a winding on Tr2. The function of the circuit thus is exactly similar to the function of the circuit of FIG. 1.

It is now assumed that $n_5$ by means of an external current generator (not shown) is fed with a direct current called here a command current. This current produces a contribution to the magnetization of Tr1. The circuit is assumed to oscillate in a large range as previously, and it can be understood that the current fed through $n_5$ does not affect the winding $n_{12}$ connected to T2, thus T2 will open exactly as previously. Once T2 has opened, current will be drawn from the lamps, i.e. in the direction from the terminal f to the terminal e. This causes a magnetization of the core of Tr1 of the direction opposite that of the magnetization caused by the current in $n_5$, and under the assumption that the magnetization generated by means of $n_5$ has a limited magnitude and specifically is smaller than the magnetization produced through $n_{13}$, a voltage will be induced by Tr1 in $n_{11}$ developing a negative voltage on T1 terminal G relative to T1 terminal S. This part of the operation is thus quite similar to the function described with reference to FIG. 1. During that interval where T2 is closed and T1 is open, a current will flow through the lamp circuit in a direction opposite of the one previously, i.e. from the terminal e to the terminal f. This produces a magnetization inducing a voltage in $n_{11}$, developing a positive voltage on T1 terminal G, to maintain the current through T1 terminals D and S as previously. However, the contribution to the magnetization by means of the winding $n_5$ will now cause the Tr1 core to be magnetically saturated at a lower value of current in $n_{13}$ than was the case when $n_5$ did not contribute. Once saturation of the Tr1 core takes place, T1 closes as explained earlier and this closing causes, as previously explained, T2 to open. It is understood that the control system makes use of a transductor principle, but that it is the command current to the transistors that is controlled by the transductor system rather than the full lamp current, such as is the case with the conventional transductor control systems.

It is seen that the current fed through the winding $n_5$ has the effect of shortening the time interval during which T1 is open for current. Since the lamps are connected in series with a capacitor C5 it is obvious that no net direct current can pass the lamps, but that the curve shape of the current passing through the lamps is modified by the control of the current waves passing T1. Similarly it can be understood that a current fed through $n_5$ in a direction opposite to the one described above will have the effect that a correspondingly larger current through $n_{13}$ will be required to saturate the magnetic core in Tr1, thus the time interval during which T1 is open will therefore be lengthened.

It is understood that the command winding $n_6$ is quite similar to $n_5$, and that by feeding currents through the winding $n_6$ in one direction or the other, the time intervals, during which T2 allows current through, may be shortened or lengthened.

By feeding in symmetrical currents through $n_5$ and $n_6$, i.e. currents of equal magnitude and in directions such that the periods during which T1 and T2 are open both are shortened or both are lengthened, it is understood that a frequency control facility of the oscillating circuits is provided, wherein the change of frequency relative to the idle frequency is variable being related to the command currents fed in, although the relation is not necessarily linear. An example of the curves over voltages and currents that may be produced by symmetrical shortening of the opening intervals for T1 and also T2 is shown in FIG. 6 with dotted lines.

As the usual frequency of the oscillating circuit, i.e. the frequency when the command current is zero and the lamps are burning is somewhat lower than the resonance frequencies of the pairs C6 and L1 and C7 and L2 respectively, an increase of the frequency will feed a larger current through the capacitors C6 and C7, this current being reactive current and therefore not representing any loss of power as the current oscillates to and fro between the capacitors and the inductances. This, however, reduces the power supplied to the lamps, but maintains peak voltages of almost unchanged magnitude so that the luminous power of the lamps is reduced while the lamp voltage still even by a substantial reduction is sufficient to ensure the proper ignition of the lamps.

A further preferred embodiment of the invention will now be explained by reference to the circuit diagram in FIG. 3 and to the arrangements of the transformer windings according to FIG. 5. As it may be seen in FIG. 5*a* or in FIG. 5*b* two ring cores or annular cores are used, and the winding for the lamp current is in either of the FIG. 5 embodiments, a simple straight passage of a conductor from the terminal e to f. The feedback winding for T1, i.e. $n_{11}$, connected from the terminal a to the terminal b in FIG. 5*a* or FIG. 5*b*, is wound around both ring cores in the same direction. In the embodiment of FIG. 5*a* each winding in the circuit from a to b is trained around first the first ring core transformer and then the second ring core transformer. In the embodiment of FIG. 5*b* the conductor passes all the windings around the first ring core and thereafter makes all windings around the second ring core in the same direction. It is appreciated by those skilled in the art that these two embodiments, though physically different, are electrically equivalent and perform similarly. The feedback winding for T2, i.e. the conductor from terminal c to terminal d, is similarly trained around both ring cores, and the figure indicates that the direction of rotation is opposite that of the feedback winding from a to b. Each ring core is provided with a command winding, and the two command windings are connected in series so that a command current, e.g. from terminal g, flows in a first direction around the first ring core and in the opposite direction around the second ring core before exiting at terminal h. It is appreciated that FIG. 5 illustrates the concept of the arrangement and the directions of the windings, but that the number of turns in each of the windings shown may differ from that indicated in the figures. It is, though, preferred to make the arrangement symmetrically, i.e. so that the winding ratios among the various windings on one core should be exactly identical to winding ratios on the opposite core.

It is appreciated that by the interconnection of the two command windings as shown there is achieved the advantageous effect that any voltage induced in one command winding by current in the output power winding e-f will always be balanced by an oppositely directed voltage of equal magnitude inducted in the second command winding. On the command winding output terminals g-h no net voltage is therefore induced. In reality there may, because of manufacturing tolerances, be minor differences between the two command windings so that moderate voltages may be induced that are not completely balanced. Furthermore, when a core saturates magnetically, a net voltage will be induced at the command winding terminals. Such voltages, however, are dampened by a capacitor C8 arranged in parallel over the terminals g-h. The electric circuit to produce the command current can therefore be sized moderately as it will not be subjected to backwards induced voltages of any considerable magnitude.

Besides the capacitor C1 a further and smaller capacitor C2 is arranged parallel to C1 with the purpose of dampening out possible high frequent noise signals to prevent them from being propagated to the mains circuits.

The operation of the circuit will initially be explained for the situation without command currents. It may be seen that it is then exactly equivalent to the circuit according to FIG. 1.

Now it is presumed that a direct current is fed through the command windings from terminal g to terminal h. This current will produce some magnetization of both transformer cores, it being presumed that this magnetization is of limited scale and in particular smaller than the maximum magnetization that can be produced by the output current from the winding e–f. The oscillator circuit will largely oscillate as earlier explained, T1 and T2 alternatively conducting current. During the time intervals where T2 is open, current passes the output winding from f to e, causing magnetization of both transformer cores. It may be seen that these two magnetization effects in transformer Tr1 will be mutually opposed while those in transformer Tr2 will be summed. Therefore saturation of the core in Tr2 will occur at a lower output current than was the case when no command current was present. The voltages induced in the feedback windings will therefore be reduced as the core of Tr2 no longer contributes hereto. In Tr1, on the other hand, saturation will not occur until an increased output current level relative to the level of current that would have produced saturation, if no command current was present. With current levels in the output circuit f–e of such magnitude that Tr2 is saturated, thus no longer contributing to the induction in the feedback windings, the core of Tr1 may therefore still contribute to this feed back induction. The net voltage induced in either of the feedback windings $n_{11}$ and $n_{12}$ respectively, thus will not completely disappear by the saturation of one transformer core, but will drop generally to about half of the immediately preceeding value.

As earlier explained the transistors used, however, have the peculiar property of being completely closed in the forward direction D to S when the voltage on G does not exceed a predetermined threshold value, e.g. around 4 Volts. By suitable sizing of the winding ratios on the transformer cores it is therefore possible to design a circuit where the voltage induced in the feedback winding for the open transistor, in this case T2, upon saturation of one transformer core will drop to below this threshold value so that the transistor essentially blocks the current between its terminals D to S completely, even though the other transformer still induces some voltage. It is here noted by reference to the curve b of FIG. 6 that the output current at the moment of opening in one transistor is changing steeply initially and thereafter at a decreasing rate, because of the inductances, connected in series with the lamps. Therefore, in the feedback windings, a relatively large voltage is induced initially during the interval of opening of one transistor, while this voltage thereafter is gradually reduced. It can therefore easily be accomplished to design the windings so that the feedback voltage upon saturation of one of the transformer cores, which is likely to occur at the latter part of this interval drops below the threshold value for the transistor in question.

As the transistor T2 now blocks, the circuit performs, as earlier explained, so that the output current, at this time flowing from f to e, starts decreasing from the maximum value, thereby inducing a magnetic field in both transformer cores directed oppositely of the earlier, and resulting in that the contributions to magnetization from the output current and from the command current are summed in transformer 1 while they are mutually opposing each other in transformer 2. In the feedback windings voltages are therefore induced, keeping T2 blocked and opening T1. The output current, initially flowing in the direction from f to e, will drop to zero and start increasing in the opposite direction, i.e. from e to f. Once the output current in the circuit from e to f has started to increase, it will after some time reach a magnitude that the transformer core Tr1 will be saturated, whereby the voltage induced in the feedback windings drops to a level that the voltage on T1 terminal G drops below the threshold value, and T1 blocks. This, however, as earlier explained, causes the opening of T2 and it can be understood that the circuit will continue oscillating, but with shorter time intervals than in the case without command currents. Thus there is obtained a frequency control facility.

Now the case where a direct current is fed through the command circuit in direction from terminal h to terminal g will be explained. As earlier explained this will cause magnetization of both cores Tr1 and TR2 respectively. As above the moment of opening of T2 for current running from terminal f through the transformers to terminal e will be explained. It is appreciated that the contributions to magnetization from the lamp current and from the command winding current are added in the core Tr1 while mutually opposing each other in the core Tr2. As the lamp circuit current increases, saturation of the core in Tr1 will occur at some point of time while the Tr2 core at the same time is not yet saturated. The saturation of the Tr1 core, however, causes the voltage induced in the feedback winding c to d to drop, and the transistor T2 blocks. As above the blocking of T2 causes transistor T1 to open and the lamp current, flowing at this time in the direction from f to e, will start to decrease. After some time the lamp current will change direction and now flow from e to f, and increase since the contributions to magnetization from the lamp current and from the command current will be mutually opposed in transformer 1 and will be summed in transformer 2. At some level of lamp current saturation in the transformer core Tr2 will therefore occur, whereby the voltage induced in the feedback winding $n_{11}$ will drop in order that the transistor T1 blocks. It is appreciated that the oscillations will continue in this way exactly as explained above.

It is hereby understood that the circuit exhibits the rather peculiar behavior that the command current has similar effect regardless of the direction hereof. The frequency of the output terminal voltage fed to the lamps is at the minimum when the command current is zero, whereby the lamps are supplied with the maximum power, and the frequency is increased by feeding in a command current, regardless of the direction of the command current, whereby the lamp power is reduced. Hereby a number of very important advantages are gained i.e.:

The power fed to the lamps can never exceed a predetermined value depending upon the circuit, it being understood that the circuit is suitably designed so that this maximum value is equal to the nominal power rating for the lamps. Hereby there is complete safety against damage to the lamps even in case of malfunctions or errors in the command circuit or errors in the connections. This also facilitates the installation, since the electrician installing the circuit does not have to keep track of a specific order of connection. Furthermore, it is obtained that the command signal does not necessarily have to be a direct current signal, as a matter of fact, it may be an alternating signal, provided that the frequency does not rise to such a magnitude as to produce interference by the interaction between the command current and the power circuit. Since the power circuit is operating at frequencies of the magnitude of 100 kHz, problems of mutual interferences will practically not be expected as long as the command frequencies do not exceed e.g. 20 kHz. Therefore the command circuit could for instance be connected to the audio output terminal in a music system, so that the audio signal could modulate the light such as one could imagine used for a speciel effect lighting in a discoteque. The command current could for instance also follow the common mains frequencies, whereby the circuit to produce the command currents could be extremely simple, it could be a transformer connected to the mains.

The circuit diagram of FIG. 4 shows a further preferred embodiment. This embodiment is used for vapour lamps without electrode heating facilities, such as mercury lamps, sodium lamps, and xenon lamps. The circuit will, as a matter of fact, operate perfectly with fluorescent tubes, although the electrodes in this case are not heated. The circuit is equivalent to that of FIG. 3, although with the difference that only one lamp La is shown and that the capacitor C6 here is not connected to the heating resistors in the lamp electrodes, but rather connected directly to the lamp electrodes, being connected to L1 and C5, respectively. It is understood that the circuit, apart from that explained above, operates exactly as the circuit of FIG. 3, thus reference may be had to the above-given explanation.

EXAMPLE 2:

For the transformers two ferrit cores are used of the type Siemens R12,5. The winding e to f is a simple straight conductor. The winding a to b makes three turns around each ring core, and the winding c to d also makes three turns around each ring core. The command windings comprise thirty windings around each core. The capacitor C2 has a magnitude of 1nF and C8 of 0.1 μF. The resistor R1 has a value of 1.5 Ω. Remaining components are equivalent to those listed under example 1, noting though that the inductance of the windings L1 and L2 is approximately 580 μH each, although they may, because of manufacturing tolerances, deviate from the said design values. The fluorescent tubes are two tubes with a nominal rating of 36 W each. Without command current the oscillation frequency with the fluorescent tubes burning was 80 kHz. When a current of 20 mA was fed through the command circuit, the oscillation frequency was 140 kHz and the power consumed by the lamps was about 20 W each. When the command circuit current was increased to 40 mA the lamps were turned off. The power consumption of the electronic circuit is in the magnitude around 4 W and varying with the lamp power so that the total system by maximum luminous output consumes a power of the order of 80 W, by a command current of 20 mA consumes around 38 W, and by 40 mA command current consumes about 1 W.

EXAMPLE 3:

Components are as in example 2 with the following exceptions: The fluorescent tubes were two pieces rated at 58 W each, and the feedback windings are made so that the winding a to b makes six turns around each transformer core, and the winding c to d correspondingly six turns around each transformer core. The inductances of L1 and L2 is around 500 μH each. Without command current, and thus full luminous power, the oscillation frequency was 70 kHz, and the power consumption 2×58 W for the fluorescent tubes and about 5 W for remaining components, thus a total of 121 W. By a command current of 20 mA the oscillation frequency was 125 kHz and the lamp power 2×30 W. The resistance in the command circuit windings is about 0.8 ohms so that the voltage drop over the command circuit by 20 mA is about 16 mV.

As mentioned above the relationship between command current and luminous power is not necessarily linear, but follows approximately a squared function. It is within the state of the art to design a control circuit which can compensate this relationship. In reality this problem does not cause extra complications as the unlinear relationship between the lamp power and luminous output makes special precautions necessary in any case.

FIG. 7 shows an example of a possible application of the device according to the invention. In a room with floor 24 and ceiling 25 a number of luminaires 21 are arranged, each being equipped with a device according to the invention. Each luminaire is supplied with mains power, which may have on/off-switch facility, but has no control facility. Through the lamps a control current circuit is also routed, connecting all luminaires in series so that the current from a single command current source passes all luminaires. At a conveniently accessible place a command unit 23 is arranged with operation buttons to turn on and turn off the light and with a tuning facility, whereon a desired luminance reference value may be dialed. In the room an illuminance meter 22 is also arranged. From the illuminance meter the command unit receives a signal, indicating the illuminance level actually present. The command unit is equipped with a control circuit that produces a command signal, depending upon the illuminance level measured, the command signal being routed to the luminaires to control their light output.

FIG. 8 shows an example of a control circuit that could be incorporated in the control unit 23. As the function of this circuit may be appreciated from the figure by those skilled in the art, it will only be briefly explained. The circuit has input connections for supply voltages 5 V DC, 12 V DC, and 220 V AC; input terminals for the illuminance meter 22, output terminals for the command current circuit, and output terminals for supplying the power to the luminaires.

The illuminance meter 22 is in this case a socalled photoresistor, having the property that the resistance decreases when the illuminance increases. An operation amplifier Op1 on the basis hereof produces a voltage, which is related to the illuminance level measured. By selection respectively tuning of the components around Op1, the requested minimum illuminance level, designated N2 (refer to FIG. 9), is defined. The signal from Op1 is passed along a way branching into two paths. The first path routes the signal through an operation amplifier Op2, serving along with its associated components the purpose of limiting the signal in order that a voltage is produced, having a predetermined maximum value e.g. 2 V by illuminance levels above a certain limit, whereas the voltage below this limiting level is varying proportional to the illuminance level. The limiting level defined by the components around Op2 defines the minimum illuminance level designated N1 (to be explained further below with reference to FIG. 9). This limited signal is passed on to a further operation amplifier Op3, which amplifier together with associated components, among which a transistor, converts the voltage signal to a current signal for use as command current for the luminaires.

The signal from Op1 is, as mentioned above, also routed along another branch, feeding it to an operation amplifier Op4. This operation amplifier Op4 performs along with its associated circuitry as a socalled Schmidt-trigger with hysteresis, i.e. so that upon increasing input signal, the output signal is set until the input signal exceeds a predeterminded first level called the turn-off level (N4 in FIG. 9), and upon decreasing input signal the output signal will only be set after the input signal has dropped below a predetermined second and lower level. This second level is designated the turn-on level (N3 in FIG. 9).

The output signal from Op4 is passed on to a delay unit Tim, which with its associate components serves the purpose of passing on the trigger signal after a delay designated the turn-off delay by increasing illuminance level, whereas the trigger signal will be passed through without delay on decreasing illuminance level. This output signal controls a relay serving to turn on and turn off the power supply for the luminaires.

The operation amplifiers Op 1–4 may be provided in a single component commercially available under the type identification LM 324, containing just four operation amplifiers in a common casing. The delay unit Tim may be realized by a component designated CD 4060.

The operation of the illuminance system with the circuitry shown in FIG. 8 will now be explained by reference to FIG. 9. In FIG. 9 the FIG. 9*a* shows an extended span of time, i.e. here in the order of 14 hours, whereas FIGS. 9*b* and 9*c* illustrate shorter intervals of time such as 20 minutes each.

The artificial illuminance system in the room is capable of providing an illuminance level N2, which is equivalent to the desired, and for operational reasons, required minimum reference level, e.g. an illuminance level at 300 lux. However, the room being equipped with transluscent portions or windows in the ceiling 26, and possibly other windows and other openings, also receives external lighting such as day-lighting. In FIG. 9*a* is illustrated how the contribution from the daylighting to the total illumination in the room could vary from nothing very early in the morning rising gradually to a maximum at noon, and thereafter decreasing to nothing at night. In the figure is also shown how the illuminance contribution from the artificial illuminance system varies. Initially only the artificial lighting is active and operating on full power, whereby the illuminance level is maintained at N2. Once daylight starts coming in, the artificial lighting is immediately tuned down in equal proportion, thus keeping the total illuminance level constant. By increasing illuminance level, at some point of time the level is reached where the circuitry around Op2 will limit the control signal as explained above, whereafter the artificial lighting will not be tuned further down, but will keep contributing a fixed minimum level N1, e.g. 100 lux. The room now receives a fixed illuminance contribution from the artificial lighting and a possibly increasing illuminance contribution from daylighting.

By increasing daylight at some time the turn-off level N4, e.g. 750 lux, may be reached, and the artificial lighting is switched off after expiry of the turn-off delay defined at Tim, e.g. 10 minutes. The room is now exclusively illuminated by the daylight, which is increasing and decreasing.

If daylighting should later drop down below the turn-on level N3, e.g. 450 lux as shown further to the right in the figure, the artificial lighting will immediately be switched on, operating on the low level N1. Only when daylighting contributes less than the amount N2 minus N1 the artificial lighting will be tuned up in order that the required minimum level N2 will just be maintained. When the daylight contribution has completely vanished the artificial lighting operates on full power.

As it is commonly known daylighting may fluctuate rapidly and irregularly due to various weather circumstances, such as passage of clouds. The examples shown in the FIGS. 9*b* and 9*c* serve to illustrate the performance of the control system during rapid fluctuations.

FIG. 9*b* illustrates a situation which could prevail at the mid of the day where daylight is strong and the artificial lighting is turned off. Suddenly a very dark cloud passes, and the daylight contribution drops to a very low level. The artificial lighting is immediately switched on and immediately tuned up to a level where the requested minimum illumination level is just maintained, taking full advantage of the remaining low daylight contribution. At a later point of time the cloud disappears. The artificial lighting is immediately tuned down to the level N1, but will only be turned off after the expiry of the turnoff delay defined by Tim.

FIG. 9*c* illustrates a different situation conceivable on a day with heavy clouding. Daylighting gives but a small contribution, and the artificial lighting is turned on and tuned up to provide a suitable contribution. Suddenly the cloud cover opens up and strong daylighting comes in. The artificial lighting is immediately tuned down to the minimum level N1, but will not even by plenty of lighting be turned off until the turn-off delay has expired. Before this can take place the clouding, however, is assumed to cover the sky again, and the artificial lighting is immediately tuned up to a suitable level.

It is understood from the above given explanation that the system described operates well during practical circumstances as the lighting of the interior is always adequate, as frequent turning on and turning off, which might shorten the life of the light sources, and which might be psychologically unattractive, is avoided, and as the energy used for illumination is kept at a minimum.

Although the invention has been described with particular reference to the application of fluorescent tubes it is obviously applicable to the controlled powering of any consumer of electric power. As already mentioned it is very well applicable to other discharge lamps such as mercury lamps, sodium lamps, xenon lamps etc.

The control facility with a command signal of the kind of a direct current or an alternating current of small magnitude also makes the invention well applicable for control or modulation in numerous ways, for instance application as a stroboscope or similar.

What is claimed is:

1. A method of controlling a frequency of alternating electrical current supplied to a power consumer, said method comprising the steps of:

producing the alternating current by utilization of an inductive feedback voltage signal fed from a magnetic material to active electronic components, amplifying the feedback voltage signal via magnetic saturation in the magnetic material to modify the relationship of induction in such a way that the current output to the power consumer cyclically changes direction, influencing said magnetic material, which is divided into two parts, by one or more command windings, conducting a command current in said command windings to magnetize the magnetic material, producing magnetic saturation in the magnetic material at values of output current different from those without said command current controlling the periods of time when the output current changes direction.

2. A device for the control of alternating electric current supplied to a load, said device comprising:

an input terminal for receiving an input power supply, an output terminal for delivering an output current to a load, an inductance element connected in series with said output terminal, said inductance element comprising saturable magnetic material, active electronic components connected between said input terminal and said inductance element including feedback windings positioned about said magnetic material, said active electronic components being controlled by electric voltages induced in said feedback windings via magnetization of said magnetic material, said magnetic material being divided into at least two parts, each part being provided with at least one further magnetization winding designated a command winding, said command winding carrying an electric current to contribute to said magnetization of said magnetic material, so that magnetic saturation of said magnetic material occurs at a current level of output current different from a current level where saturation would have occurred without said command windings such that the relationship of induction in said magnetic material causes said active electronic components to cyclically alter the direction of said output current.

3. A method for controlling the frequency of an alternating electric output current conveyed to a power consumer, said method employing a device having active electronic components and an inductance element comprising magnetic material divided into two parts, said inductance element and said electronic components connected between a power input terminal connected to an input power source and an output terminal at said power consumer, said method comprising the steps of:

providing an inductive feedback signal between said magnetic material and said active electronic components, amplifying said feedback signal via magnetic saturation in said magnetic material for modifying a relationship of induction in said inductance element, providing a command current fed into command windings placed about said magnetic material, said command current contributing to magnetize said magnetic material for magnetically saturating said magnetic material at predetermined values of output current so that said output current changes direction at predetermined time intervals corresponding to occurrences of magnetic saturation in said magnetic material.

4. A transformer means comprising a first and a second core of saturable, magnetic material, said cores supporting at least a power winding, two feedback windings and a command winding positioned about said magnetic material, wherein said power winding is routed in one or more turns around both of said cores in a first direction, wherein each of said feedback windings is routed in one or more turns around both of said cores in said first direction, and wherein said command winding is routed in turns around said first magnetic core in said first direction and continued in turns around said second magnetic core in a direction opposite to said first direction.

5. A transformer means according to claim 4, wherein each and every turn of said feedback winding is routed around both of said magnetic cores.

6. A transformer means according to claim 4, wherein each of said feedback windings is routed in turns around said first magnetic core in said first direction and continued in turns around said second magnetic core in said first direction.

7. A device for the control of alternating electric current supplied to a load, said device comprising:

an input terminal for receiving an input power supply;

an output terminal for delivering an output current to a load;

a control terminal for receiving a command input current;

a transformer means comprising saturable, magnetic material, said transformer means supporting at least a power winding, two feedback windings and a command winding positioned about said magnetic material, said power winding being connected with said output terminal, said command winding being connected with said control terminal, active electronic components connected between said input terminal and said transformer means, said active electronic components being controlled by electric voltages induced in said feedback windings via magnetization of said magnetic material; and said magnetic material being divided into a first and a second core part wherein said power winding is routed in one or more turns around both of said core parts in a first direction, wherein each of said feedback windings is routed in one or more turns around both of said core parts in said first direction, and wherein said command winding is routed in turns around said first magnetic core part in said first direction and in turns around said second magnetic core part in a direction opposite to said first direction.

8. A luminaire for gas discharge lamps comprising:

an input terminal for receiving an input power supply;

a control terminal for receiving a command input current; and a device for generating alternating, electric current for powering a lamp, said device comprising:

a transformer means comprising saturable, magnetic material, said transformer means supporting at least a power winding, two feedback windings and a command winding positioned about said magnetic material, said power winding carrying the current to power the lamp, said command winding being connected with said control terminal, said device further comprising active electronic component connected between said input terminal and said transformer means, said active electronic components being controlled by electric voltages induced in said feedback windings via magnetization of said magnetic material, said magnetic material being divided into a first and a second core part, wherein said power winding is routed in one or more turns around both of said core parts in a first direction, wherein each of said feedback windings is routed in one or more turns around both of said core parts in said first direction, and wherein said command winding is routed in turns around said first magnetic core part in said first direction and in turns around said second core part in a direction opposite to said first direction.

9. An illumination system comprising a luminaire fitted with a gas discharge lamp;

an illuminance measuring device capable of detecting illuminance developed by said luminaire and providing an output signal related to the illuminance measured;

and a control device, said control device having an input for receiving the output signal provided from said measuring device, a power input for connection to an input power supply, a power output and a command current output, said luminaire comprising:

an input terminal for receiving power from said control device, a control terminal for receiving a command input current from said control device, and a device for generating alternating, electric current supplied to said lamp, said device comprising:

a transformer means comprising saturable, magnetic material, said transformer means supporting at least a power winding, two feedback windings and a command winding positioned about said magnetic material, said power winding carrying the current supplied to the lamp, said command winding being connected with said control terminal;

said device further comprising active electronic components connected between said input terminal and said transformer means, said active electronic components being controlled by electric voltages induced in said feedback windings via magnetization of said magnetic material so as to generate cyclic oscillations:

said magnetic material being divided into a first and a second core part, wherein said power winding is routed in one or more turns around both of said core parts in a first direction, wherein each of said feedback windings is routed in one or more turns around both of said core parts in said first direction, and wherein said command winding is routed in turns around said first magnetic core part in said first direction and in turns around said second core part in a direction opposite to said first direction, said control device comprising means to switch on and switch off the power output, said control device comprising means to generate a command current through said command current output, and processing logic means including a time delay unit and receiving the signal from said illuminance measuring device and controlling said switching means and said command current generating means in such a way that the illuminance measured by the measuring device is always maintained larger than or equal to a desired minimum reference level, so that the power supply to the luminaire is switched on in case the illuminance level drops below a first predetermined level, and so that the power supply to the luminaire is switched off once the illuminance level during an uninterrupted interval of time defined by said time delay unit has exceeded a second predetermined level.

* * * * *